March 24, 1953
J. JORDAN
2,632,223
CUP TURNING MACHINE
Original Filed April 8, 1949
2 SHEETS—SHEET 1
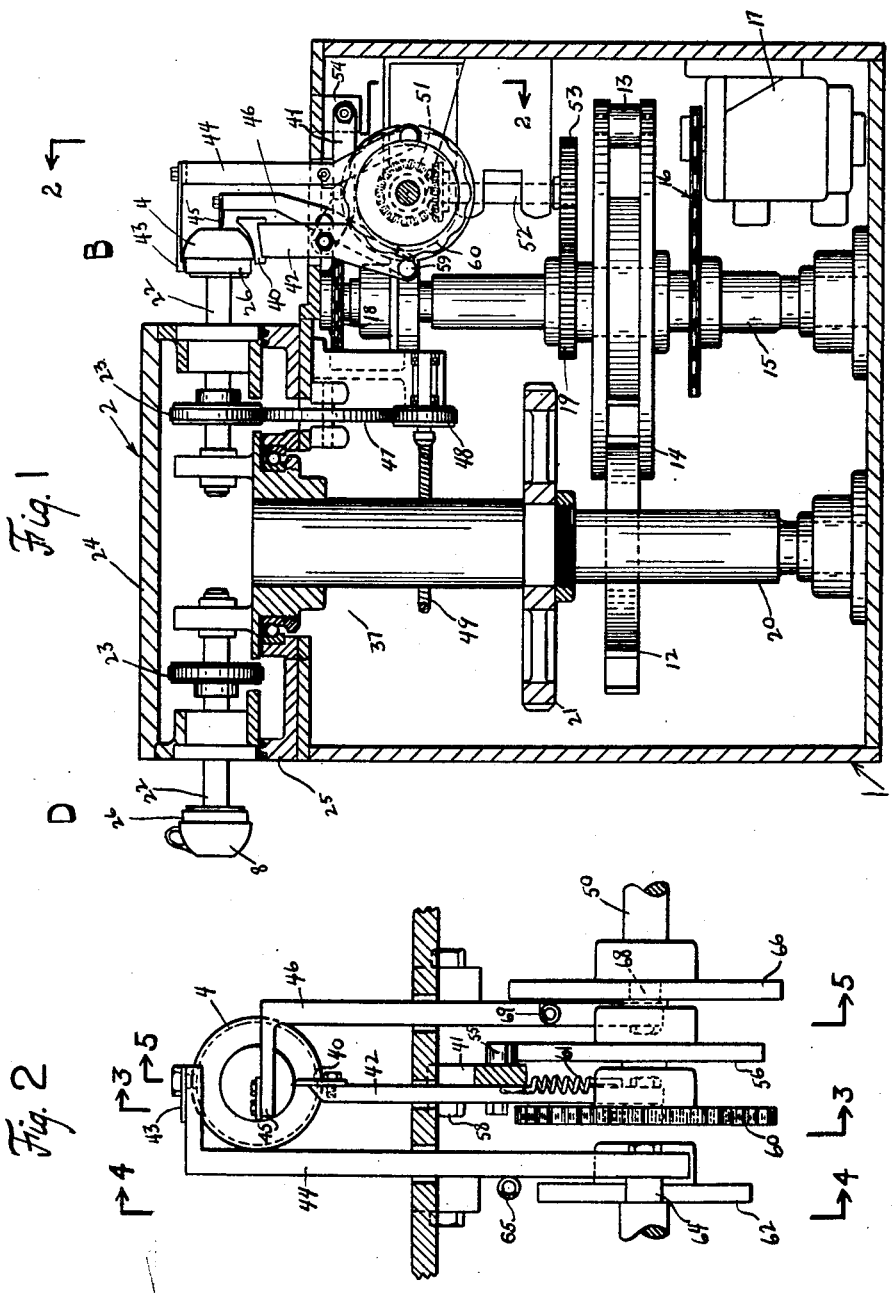
INVENTOR.
JACOB JORDAN
BY
Ely & Frye
ATTORNEY March 24, 1953 J. JORDAN 2,632,223
CUP TURNING MACHINE
Original Filed April 8, 1949 2 SHEETS—SHEET 2
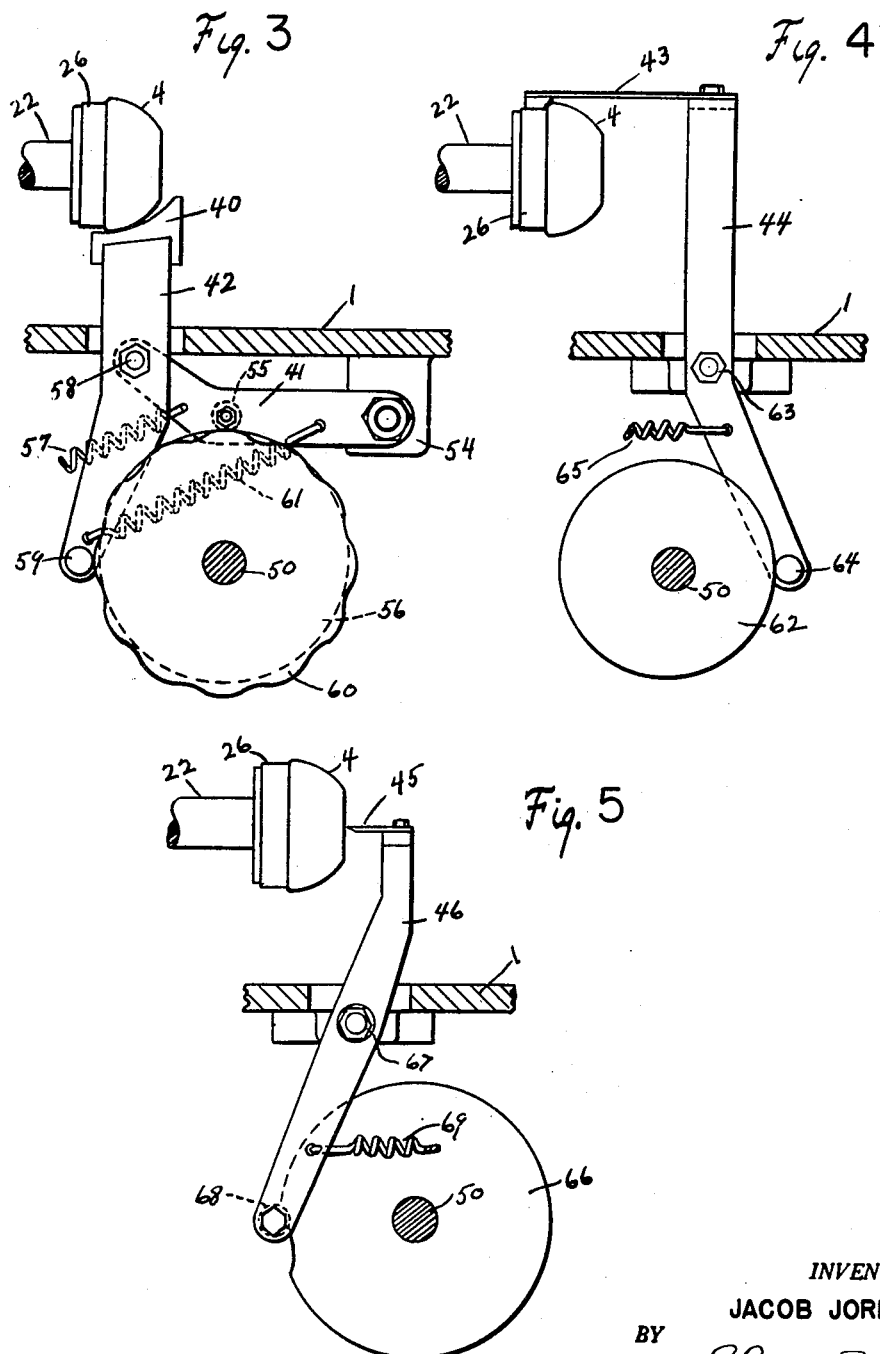
INVENTOR.
JACOB JORDAN
BY
Ely a Frye
ATTORNEY Patented Mar. 24, 1953

2,632,223

UNITED STATES PATENT OFFICE 2,632,223

CUP TURNING MACHINE

Jacob Jordan, New Castle, Pa., assignor, by mesne assignments, to Peoples First National Bank & Trust Company, Pittsburgh, Pa., a national banking association Original application April 8, 1949, Serial No. 86,260. Divided and this application August 28, 1951, Serial No. 244,024

4 Claims. (Cl. 25—22)

This invention relates to a machine for forming handled cups or other hollow ware of china and like ceramic ware, and more particularly, to a machine which automatically turns and shapes the outer surface of a jiggered cup body. This application is a division of my co-pending application Serial No. 86,260, filed April 8, 1949.

Heretofore the above operations in forming jiggered cups have largely been manual operations in ceramic plants. That is, to form a cup, plastic clay is jiggered in a suitable jigger mold to form a rough cup blank of green ware, in which the inside of the cup is shaped. The blank is then placed in a suitable drier to dry and "temper" the green ware until it is suitable for turning. The green cup blank is then placed on a chuck in a turning lathe, where a turner, using a series of shaped-edge gouges, manually forms the foot, the outer contour of the cup, and the rim of the cup; although the rate of cut is much faster because the material is softer, the turning operation does not initially appear to be too dissimilar to the hand turning of wood, rough and finish cuts being taken and care having to be exercised to avoid tearing and spoiling the work due to chattering of the tool and the taking of rough cuts which are too deep.

Because turners are the most highly skilled, and, therefore, the most highly paid workers in clay fabricating shops, numerous efforts have been made to develop automatic clay turning machines similar to automatic wood turning machines. Such efforts have not been successful, however, due to the failure to appreciate the different tool manipulations required in turning soft green clay.

After the cup bodies are turned and the handles trimmed, the trimmed ends of the handles are dipped in an adhesive clay slip and stuck by hand on the cup bodies. The green ware is then sponged and placed on the drier tray for final drying before firing. Because the contour of the cup body and the contour of the trimmed handle are determined by the eye of the artisan, substantial variations in these contours were inevitably encountered. A girl sticking handles can usually adjust the position of the handle on the cup bodies so that the contoured surfaces will mate, but, as would be expected, a number of trimmed handles must be discarded because of improper contour and a number of handles are crookedly placed. So far as is known, no one has yet attempted to provide a machine for accomplishing the manual operation of sticking a trimmed handle to a cup.

It is the object of this invention to provide a machine which will automatically accomplish the operation of turning the cup blank, only relatively unskilled labor being required to operate the machine. It is an advantage of my invention that, not only is more precisely contoured ware produced, but spoilage is reduced and the labor involved is greatly reduced.

Other and further advantages of my invention will be apparent from the following specification and drawings of a preferred embodiment of my machine, in which Figure 1 is a side elevation, partly in section, of a machine made according to my invention.

Figure 2 is a view taken along line 2—2 of Figure 1.

Figure 3 is a view, taken along line 3—3 of Figure 2, of the cup bowl turning tool, cam, and cam follower linkage.

Figure 4 is a view, taken along line 4—4 of Figure 2, of the lip turning tool, cam, and cam follower linkage.

Figure 5 is a view, taken along line 5—5 of Figure 2, of the foot facing tool, cam, and cam follower linkage.

In the drawings, in which like reference characters refer to like parts, my machine comprises a general frame and case 1 on which is mounted a cup turret 2. The cup turret 2 is provided with suitable cup chucks intermittently indexed from a cup loading station to the turning station B to a handle sticking station and thence to the handled cup unloading station D.

The turret 2 is mounted upon and indexed by the turret shaft 20 stepped in the casing 1. Synchronous indexing of the shaft 20 and the turret 2 is obtained by the large shaft gear 21 which meshes with a jack shaft gear 11 mounted on a vertical jack shaft 10, located directly behind the turret shaft 20 in Figure 2. The jack shaft is intermittently indexed through 90° by means of the Geneva gear 12 which is mounted on the jack shaft. The Geneva gear 12 is driven by the single roller tooth 13 of the Geneva pinion 14 mounted on the constantly rotating main drive shafts 15, which is driven by sprocket and chain drive 16 from the main driving motor 17. In addition to indexing the turret 2 intermittently through 90° by the above described Geneva drive and jack shaft, the main drive shaft 15 also drives the cup-turning tool cam shaft drive by means of the cam shaft power take-off gear 19, the construction and operation of which mechanism will be more fully described below.

The cup turret 2 carries four horizontal, suitably journaled spindles 22, each carrying a friction gear 23 mounted on the spindles between spindle bearings carried by the housing 24 of the rotatable turret 2, the turret housing 24 being journaled for rotational movement on the bearing ring 25 carried by the casing 1. The lower peripheries of the spindle friction gears 23 extend through suitable slots in the base of the turret housing into the annular space provided between the bottom of the turret housing and the adjacent top of the casing 1. Mounted on the ends of the spindles 22 which project beyond the turret housing 24 are the cup chucks 26 on which the green jiggered cup blanks 4 are mounted at the cup loading station.

The cup chucks 26 are simply turned hardwood blocks having the desired contour of the inside of the finished cup 8 which is eventually to be produced. The tempered cup blank 4 has been previously jiggered so that the contour of its inside surface is substantially the same as the contour of the outside of the cup chuck 26. To mount the cup blank 4 on the chuck 26, the blank is simply pressed on the mating surface of the spinning chuck until, the blank being rather loosely held in the loader's hand, the frictional grip and adhesion of the blank 4 to the chuck 26 turns the blank in the operator's hand. The blank is thereby securely held on the chuck for the subsequent turning and handling operations.

As a spindle 22, its chuck 26 loaded with a cup blank 4, is indexed to the cup turning station B, it is quickly brought up to speed as its friction gear 23 engages the friction gear 47, hung beneath the top of the case 1 in suitable bearings so that the upper periphery of the gear 47 will extend, through a suitable slot in the case, into the annular space between the turret housing 24 and case 1 to be contacted by the gear 23. The friction gear 47 is driven continuously by a friction drive gear 48, which, in turn, is driven by the flexible shaft 49, which is connected to the shaft of a constantly driven power means (not shown).

At the cup turning station B the jiggered cup blank 4 is engaged and cut by the cup body turning tool 40, mounted on its compound cam levers comprising the advancing lever 41 and the oscillating lever 42. The body turning tool 40 shapes the outside of the cup blank 4 to the desired outside contour of the cup body. As the turning tool 40 reaches its maximum advanced position to make its finishing cut, the lip turning tool 43, mounted on its cam lever 44 and the foot facing tool 45, mounted on its cam lever 46, are advanced to turn the lip and finish the foot of the blank 4. Upon completion of the cuts made by the tools 43 and 45, all turning tools 40, 43 and 45 are retracted, the cup blank 4 having been turned and becoming the cup body 5, and the turret is indexed to carry the turned cup body to the handle sticking station C.

The advancement and retraction of the several cup turning tools within the period a spindle 22 remains at the turning station B is controlled by the several tool cams mounted on the tool cam shaft 50, which is driven through the bevel gearing 51 by the cam jack shaft 52. The cam jack shaft 52 is, in turn, driven by its gear 53 which meshes with the cam shaft power take-off gear 19, mounted on the main drive shaft 15, as stated above. The several tool operating cams are indexed in the cam shaft to operate as stated above and are as follows:

The cup body turning tool 40 is operated through its compound levers 41 and 42. The tool advancing lever 41 is pivoted on the bracket 54 and carries the roller follower 55 which follows the disk cam 56 to raise and lower the pivoted oscillating lever 42, the follower 55 being held on the edge of the cam 56 by the tension spring 57. The cam 56 is substantially an eccentric cam and may be provided with a slight dwell at its locus of maximum throw to provide a finishing cut as the tool 40 reaches its maximum advance. The end of the cam lever 41 carries the pivot 58 for the oscillating cam lever 42, on the upper end of which the cup body turning tool 40 is mounted. The lower end of the cam lever 42 is provided with a roller follower 59 which engages the edge of the scalloped disc cam 60, the follower 59 being held against the cam 60 by the tension spring 61.

As is apparent from the foregoing and from Fig. 3 of the drawings, the cam lever 41 carries the oscillating lever 42 to raise and lower and thus advance and retract the cutting tool 40 to trim off the excess clay in the cup blank 4. However, as the tool 40 is advanced by the lever 41, it is also oscillated about the pivot 58. The effect of the oscillation of the tool 40 to roll the tool axially along the surface of the blank 4 being cut, so that at any one instant, only a relatively short portion of the contoured cutting edge of the tool 40 is in actual cutting and shearing contact with the clay of the blank 4. The effect of the oscillation of the tool 40, therefore, is to produce, without actually advancing the tool axially, an axially advancing helical cut similar to that taken when cups are turned manually and the turner moves his manually held tool axially. By this means this invention avoids the tearing of the clay and slippage on the chuck which has heretofore been encountered when it has been atttempted to turn the cup with a contoured tool corresponding to the desired contour of the cup body. It is to be noted that the contour of the cutting edge of the tool 40 (Fig. 3) does not correspond to the cut surface of the blank 4 but is an evolved curve based upon the desired contour of the cup wall but modified by the effect of the oscillation and advancement of the cutting tool.

The turning of the lip of the cup is normally the last operation in the turning of a cup body by hand, but in this machine it may be performed substantially with the foot-forming operation. Because only a narrow cut is taken in turning the lip, no oscillation of the tool is necessary, nor is the reversal of the spindle necessary, as is customary in hand-turning, the lip cut being taken by the hook-shaped cutting edge of the tool 43 as it is advanced by its lever 44. The lever 44 is offset from the center line of the spindle 22 to extend through a suitable opening in the case 1, where its advancement and retraction is controlled by the lip-turning cam 62, the lever 44 being pivoted on the pivot 63 and provided with a roller cam follower 64. The follower 64 is held against the edge of the cam 62 by a suitable tension spring 65. Because the movement of the lip turning tool 43 is a simple advancement and retraction, the cam 62 is substantially an eccentric disc, as shown.

The foot in the cup blank 4 is formed by a face cut, preferably taken by the foot facing tool 45 substantially simultaneously with the lip turning operation. The foot facing tool lever 46 is offset oppositely to the offset of the lip tool lever 44 and extends through a suitable opening in the casing 1, where its advancement and retraction is controlled by the foot facing disc cam 66, the lever 46 being pivoted on the pivot 67 and provided with a roller follower 68. The follower 68 is held against the end of the disc cam 66 by means of a suitable tension spring 69. [The several follower operating tension springs 61, 65, and 69 are omitted in Fig. 3 for sake of clarity.] Because the blank 4 exerts little torque upon the foot facing tool 45, the tool 45 is contoured to the desired contour of the foot, the tool being advanced at the desired rate and then held at its point of maximum advance by the dwell shown in the cams 66 in order to provide a finish cut.

When the spindle 22 reaches the unloading station D, an unloading operator simply grips the top of the finished cup 8 in her finger tips, removes it from the chuck 26 and passes it to a sponger, who fettles off any turning tool marks or the like before placing the handled cup on the conveyor or ware board employed to carry the cups to the drier preparatory for firing in the kiln.

From the foregoing it is evident that various elements of the preferred embodiment of my cup turning machine may be altered or modified without departing from the teaching of my invention. The invention, therefore, is not limited to the specific embodiment disclosed but may be modified and varied within the scope of the following claims without departing from the purpose and spirit thereof.

What is claimed is:

1. In a machine for automatically turning green ceramic ware, a spindle, means supporting said spindle and for indexing said spindle to and away from a cutting station, a ware chuck mounted on said spindle, means for rotating said spindle and chuck while said spindle is indexed at said cutting station, a plurality of ware cutting tools mounted at said cutting station, means to non-simultaneously advance and retract said tools to engage and cut ware carried by said chuck when said chuck is indexed at said station, means operating said tool advancing and retracting means in timed relationship with said spindle indexing means to cause said tools to be advanced and retracted to clear the ware during the period said spindle is indexed at said cutting station, means to rock at least one of said ware cutting tools during advancement along components normal to its path of advancement.

2. In a machine for automatically turning green ceramic ware, a spindle, means supporting said spindle and for indexing said spindle to and away from a cutting station, a ware chuck mounted on said spindle, means for rotating said spindle and chuck while said spindle is indexed at said cutting station, ware cutting tools mounted at said cutting station, means to advance and retract said tools to engage and cut ware carried by said chuck when said chuck is indexed at said station, and means operating said tool advancing and retracting means in timed relationship with said spindle indexing means to cause said tools to be advanced and retracted to clear the ware during the period said spindle is indexed at said cutting station, said cutting tools including a body cutting tool adapted to turn a surface having a component parallel to the axis of said spindle and including means to rock said tool in an axial direction as said tool is advanced.

3. In a ware turning machine as defined in claim 2 in which the means for advancing said body cutting tool comprises a first cam, a first cam lever actuated by said first cam, and a second cam lever carrying said body cutting tool, and pivoted on said first cam lever, whereby the actuation of said first cam lever by said first cam advances and retracts said body cutting tool, said means for rocking said tool as it is advanced comprising a second cam which oscillates said second cam lever as it is advanced by said first cam.

4. In a machine for automatically turning green ceramic ware, a spindle, means supporting said spindle and for indexing said spindle to and away from a cutting station, a ware chuck mounted on said spindle, means for rotating said spindle and chuck while said spindle is indexed at said cutting station, a plurality of ware cutting tools mounted at said cutting station, means to non-simultaneously advance and retract said tools to engage and cut ware carried by said chuck when said chuck is indexed at said station, and means operating said tool advancing and retracting means in timed relationship with said spindle indexing means to cause said tools to be advanced and retracted to clear the ware during the period said spindle is indexed at said cutting station, said cutting tools including a body cutting tool adapted to turn a surface having a component parallel to the axis of said spindle and including means to rock said tool in an axial direction as said tool is advanced, said tool advancing and retracting means comprising cams, said means for operating said tool advancing and retracting means in timed relationship with the indexing of said spindle comprising a cam shaft operating said cams and a drive connecting said cam shaft to said means for indexing said spindle.

JACOB JORDAN.

REFERENCES CITED

The following references are of record in the file of this patent:

UNITED STATES PATENTS

| Number | Name | Date |
| --- | --- | --- |
| 1,268,984 | McCormick | June 11, 1918 |
| 1,751,049 | Miller | Mar. 18, 1930 |
| 1,762,387 | Dengler | June 10, 1930 |